Oct. 16, 1951      E. A. STALKER      2,571,304
SLOTTED WING STRUCTURE FOR AIRCRAFT
Filed Aug. 21, 1946      2 Sheets-Sheet 1
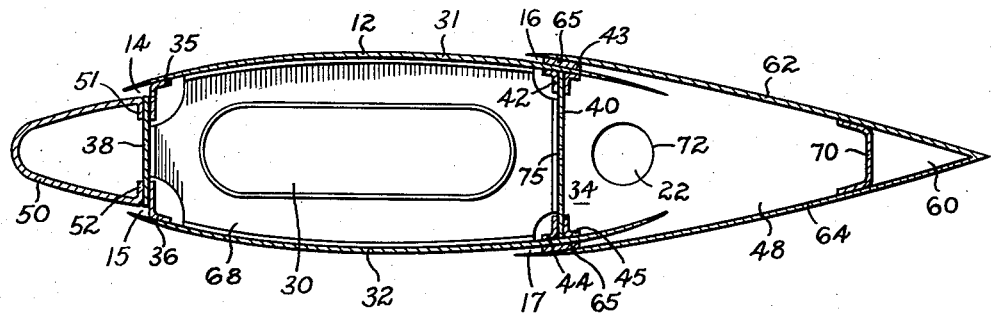
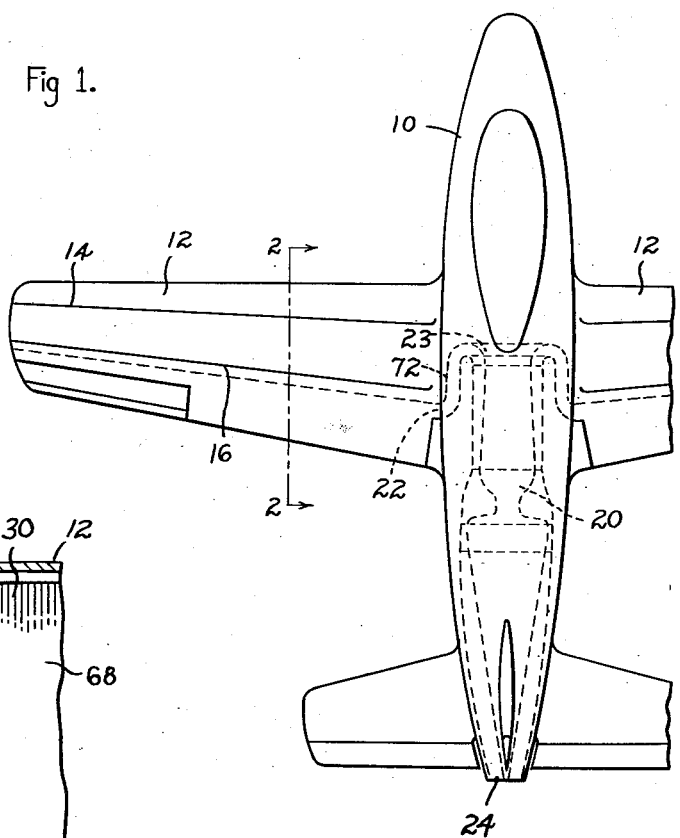
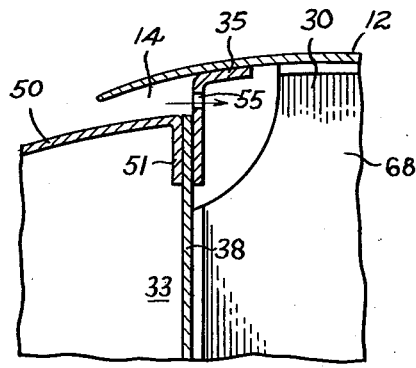
Inventor
Edward A. Stalker
By Marschall & Biebel
Attorneys Oct. 16, 1951 E. A. STALKER 2,571,304
SLOTTED WING STRUCTURE FOR AIRCRAFT
Filed Aug. 21, 1946 2 Sheets-Sheet 2

Inventor
Edward A. Stalker
By
Marechal & Biebel
Attorneys

Patented Oct. 16, 1951

2,571,304

UNITED STATES PATENT OFFICE 2,571,304

SLOTTED WING STRUCTURE FOR AIRCRAFT

Edward A. Stalker, Bay City, Mich.

Application August 21, 1946, Serial No. 692,033

8 Claims. (Cl. 244—40)

1

This invention relates to aircraft and more particularly to wing structures adapted for the intake of air through the surface, particularly the boundary layer.

It is the principal object of the invention to provide an aircraft wing structure having a surface slot therein for the purposes of boundary layer control of such construction that adequate strength of the wing is assured while providing for efficient flow of air through the slot.

It is a further object to provide such a wing structure having a plurality of surface slots so arranged as to secure efficient and highly satisfactory handling of the air flow while maintaining high strength in the structure itself such as adequately to withstand the shearing forces to which it is subjected.

Other objects will be apparent from the following description, the accompanying drawings, and the appended claims.

In the drawings,

Fig. 1 is a fragmentary top plan view of an airplane constructed in accordance with the present invention;

Fig. 2 is a vertical section through the wing along the line 2—2 of Fig. 1;

Fig. 3 is an enlarged fragment of the joint at the forward upper slot of the wing.

Figure 4:
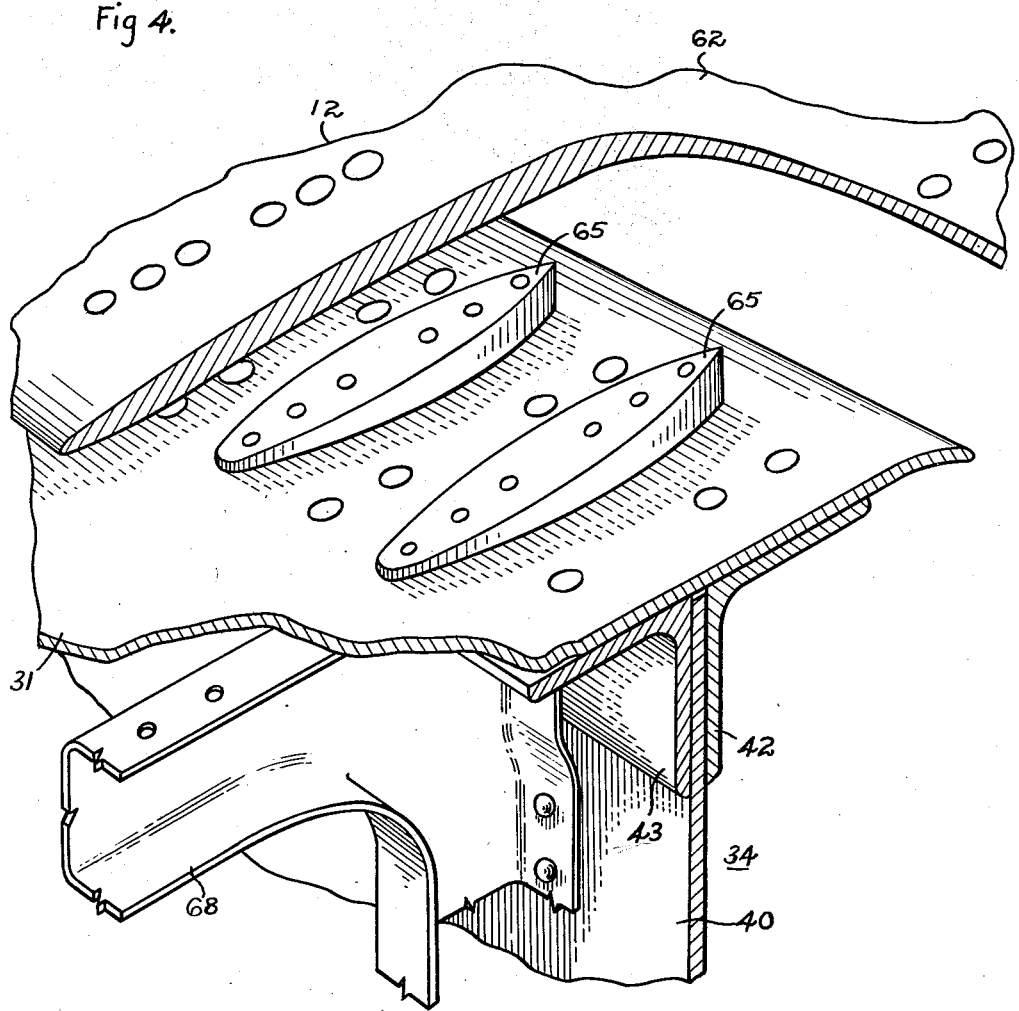
Fig. 4 is an enlarged fragmentary perspective of the joint at the rear upper slot of the wing.

Wing structures usually rely upon the outer walls and a vertical spar member or members to resist the torque on the wing. This torque is resisted by shear in the structure along spanwise as well as chordwise planes. When a spanwise slot of substantial extent is placed in the surface the structure is greatly weakened in its ability to provide the shear resistance needed.

The present invention discloses a wing structure with a plurality of slots in its surface and which nevertheless is strong and light.

Referring particularly to the drawings, the airplane is shown as having a fuselage 10 and slotted wings 12. Each wing has forward slots 14 and 15 and rearward slots 16 and 17. The jet engine 20 in the fuselage 10 has its compressor inlet 22 in communication with the wing interior to induct boundary layer air through the wing slots. The engine discharges its jet rearward at 24 to propel the aircraft.

The main structure resisting torsion is the boxlike structure 30 formed by the upper and lower skins 31 and 32 of sheet metal or the like and spars 33 and 34. The skins are fixed to the angles 35 and 36 at the front which angles are secured

2 together by the forward vertical web 38. The spar 33 could be a simple channel of one piece. In fact the forward web 38 with the angles 35 and 36 fixed to it may be regarded as a channel member. In the rear the upper and lower skins are joined by the web 40 and the upper angles 42 and 43 and lower angles 44 and 45. Web 40 forms the forward wall of a rear compartment 48. While the structure shown and described incorporates surface slots in both the upper and lower wing surfaces, it will be evident that the slots can be confined to either surface as desired.

The skins 31 and 32 overhang the nose member 50 which has the legs 51 and 52 turned inward and fixed to the web 38. This trailing end of the nose member is narrow enough to form slots 14 and 15 between itself and the overhanging portions of the upper and lower skins 31 and 32, respectively.

The amount of air necessary to be inducted through slots near the nose of the wing in order to control the boundary layer is so small that the destruction of its energy is not important. Hence, as soon as inducted this air may be allowed to expand abruptly into the interior of the box 30, and this may be accomplished as disclosed herein while preserving a rigid structure capable of resisting torsion.

To allow passage of the inducted air from the slots while preserving the rigid connection between the skin and the web 30, small holes 55 are drilled in spaced relation along the length of the slots 14. The holes are formed in angles 35 and 36 respectively to thus admit air to the interior of structure 30.

The rear structure 60 is not subjected to the great loads of the forward portion and so a less rigid connection can be used. The outer skins 62 and 64 are joined to the skins 31 and 32 respectively through a series of spanwise separated spacers 65 of streamline form which as shown are located within and assist in forming slots 16 and 17 (Fig. 4). These spacers are positioned outwardly of the upper and lower flanges 42 and 44 of the rear spar and are secured by rivets extending through the upper and lower skins, the spacers and the flanges of the rear spar. It is important that these members lap each other directly above the spar flange. At several localities along the span, struts 68 interconnect the front and rear webs 38 and 40. The end of such a strut is shown attached to web 40 in Fig. 4 and is shown in elevation in Fig. 2.

The rear compartment 48 should be smooth and free of acute angles in order to conserve the velocity energy in the internal flow. For this reason the rear spar has the continuous web 40 and the rear end of the flap is provided with the spanwise member 70 which excludes the acute angle at the trailing edge.

The air is drawn out of forward compartment 30 into the rear compartment 48 through a series of small holes 75 whose total area is greater than that of apertures 55 in the front channels.

The quantity of air to be inducted at the rear slots 16 is large in comparison and its energy cannot be destroyed without a serious loss in propulsive efficiency. Slots 16 are relatively deep chordwise and gradually expand to introduce the air into rear compartment 48 with the least disturbance. Compartment 48 communicates with the compressor inlet 23 via a suitable duct 72.

From the above it will be apparent that the construction described provides for direct and efficient induction of the boundary layer air through wing surface slots, and for the efficient handling of such air following its induction to provide for delivery thereof with a minimum of loss of energy into the compressor of the power plant. In addition, the strength of the structure is maintained and thus the provision of wing slots of substantial spanwise extent, and located on either or both of the wing surfaces, is made practicable without adversely affecting the physical strength of the structure.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an aircraft, in combination to form a slotted wing structure of high strength capable of resisting shear forces economically, an outer wall on one side of said wing, an inner wall on the same side of said wing spaced inward from said outer wall, said walls overlapping to form a slot establishing communication between the wing surface and the wing interior for conducting air chordwise, and a spar structure extending from one side of said wing structure toward the other and including a vertical spanwise member forming a part thereof and fixed to said inner wall and to said outer wall and extending across said slot, said member having a plurality of spaced holes therein to provide for passage of air from said slot through said member.

2. In an aircraft, in combination to form a slotted wing structure capable of resisting shear forces economically, an outer wall, an inner wall spaced from said outer wall, both said walls being on the same side of said wing and overlapping to form a slot for conducting air chordwise, a spar structure extending from one side of said wing structure toward the other, and a structural member carried on said spar and fixed to said walls across the exit end of said slot, said member being integral across said slot and along a substantial length of said slot and having a plurality of spaced holes therein for the passage therethrough of air from said slot.

3. In an aircraft, in combination to form a slotted wing structure capable of resisting shear forces economically, an outer wall on one side of said wing, an inner wall on the same side of said wing spaced inward from said outer wall, said walls overlapping to form a slot for conducting air chordwise, said slot extending along a substantial length of the wing span, and a vertical channel member having its legs directed chordwise, one of said legs being fixed to said outer wall, the web of said channel extending across said slot and being fixed to said inner wall, said member having a plurality of holes spaced spanwise to provide a passage for air in said slot through said member.

4. In an aircraft, in combination to form a slotted wing structure capable of resisting shear forces economically, an outer wall, an inner wall spaced inward from said outer wall, both said walls being on the same side of said wing and overlapping to form a forwardly opening slot of increasing vertical width in the chordwise direction for conducting air chordwise, and a spar structure extending from one side of said wing structure toward the other and incorporating a vertical spanwise member fixed to said inner wall and to said outer wall across the exit end of said slot, said member having a plurality of spaced holes therein to provide for passage of air from said slot through said member.

5. In an aircraft, in combination to form a slotted wing structure capable of resisting shear forces economically, an outer wall on one side of said wing, an inner wall on the same side of said wing spaced inward from said outer wall, said walls overlapping to form a slot for conducting air chordwise, a vertical web, and a member fixed to the outer wall and to said web in a vertical plane to provide junction material in shear along said vertical plane at a locality on said web inward from said wall, said member being integral across the slot and along a substantial length of said slot, said member having a plurality of holes therein for the passage of air from said slot through said member.

6. In an aircraft, in combination to form a wing, a central upper wall and a central lower wall spaced therefrom, front and rear vertical members at opposite ends of said walls fixed therebetween to form a box-like structure, a nose member fixed to said front vertical member to provide a wing nose, said upper and lower walls overlapping said nose member and being spaced outward therefrom to form an upper and a lower slot therebetween, means providing communication for said slot through said front vertical member into the wing interior, a trailing upper wall and a trailing lower wall each overlapping the rear end of said central upper and lower walls respectively in vertical alignment with said rear vertical member, spacers to space said trailing walls from said respective central walls to form upper and lower slots leading into the wing interior aft of said rear vertical member, and means to fix both said walls to said spacer and to said vertical member.

7. In an aircraft, in combination to form a wing, a central upper wall and a central lower wall spaced therefrom, front and rear vertical members at opposite ends of said walls fixed therebetween to form a box-like structure, a nose member fixed to said front vertical member to provide a wing nose, said upper and lower walls overlapping said nose member to form an upper and a lower nose slot respectively therebetween, a connecting member fixed to a said wall and to the adjacent said vertical front member in a vertical plane to provide junction material in shear along said vertical plane at a locality on said connecting member inward from said wall, said connecting member being integral across said slot and along a substantial length of said slot, said connecting member having a plurality of apertures therein for the passage of air from said slot through said member, and a trailing upper wall and a trailing lower wall each overlapping the rear end of said central upper and lower walls respectively in spaced vertical alignment with said rear vertical member to form upper and lower rear slots leading into the wing interior aft of said rear vertical member, said trailing walls being fixed to said rear vertical member, said trailing walls and said rear member providing a substantially closed streamline duct for the flow of inducted air therein with minimum losses.

8. In an aircraft, in combination to form a wing, a central upper wall and a central lower wall spaced therefrom, front and rear vertical members at opposite ends of said walls fixed therebetween to form a box-like structure, a nose member fixed to said front vertical member to provide a wing nose, said upper and lower walls overlapping said nose member to form an upper and a lower nose slot respectively therebetween, a connecting member fixed to a said wall and to the adjacent said vertical front member in a vertical plane to provide junction material in shear along said vertical plane at a locality on said connecting member inward from said wall, said connecting member being integral across said slot and along a substantial length of said slot, said connecting member having a plurality of apertures therein for the passage of air from said slot through said member, and a trailing upper wall and a trailing lower wall each overlapping the rear end of said central upper and lower walls respectively in spaced vertical alignment with said rear vertical member to form upper and lower rear slots leading into the wing interior aft of said rear vertical member, said trailing walls being fixed to said rear vertical member, said trailing walls and said rear member providing a substantially closed streamline duct for the flow of inducted air therein with minimum losses, said rear vertical member having a plurality of small openings for the passage of air from said nose slots into said wing interior aft of said rear vertical member, the area of said openings in said rear member being a minor fraction of the cross sectional areas of said rear slots.

EDWARD A. STALKER.

REFERENCES CITED

The following references are of record in the file of this patent:

UNITED STATES PATENTS

| Number | Name | Date |
|---|---|---|
| 2,272,664 | Gropler | Feb. 10, 1942 |
| 2,277,173 | Wagner et al. | Mar. 24, 1942 |
| 2,277,175 | Wagner | Mar. 24, 1942 |
| 2,302,925 | Von Schlippe | Nov. 24, 1942 |
| 2,430,431 | Lanier | Nov. 14, 1947 |